United States Patent [19]

Tanaka

[11] Patent Number: 5,258,790
[45] Date of Patent: Nov. 2, 1993

[54] VARIABLE FORMAT CAMERA WITH A RETRACTABLE LENS

[75] Inventor: Tasuhiko Tanaka, Yono, Japan

[73] Assignee: Fuji Photo Optical Co., Ltd., Omiya, Japan

[21] Appl. No.: 871,226

[22] Filed: Apr. 20, 1992

[30] Foreign Application Priority Data

Apr. 19, 1991 [JP] Japan .................................. 3-115369

[51] Int. Cl.[5] ............................................ G03B 37/00
[52] U.S. Cl. ...................................... 354/94; 354/159; 354/195.1
[58] Field of Search ..................... 354/94, 95, 96, 98, 354/99, 159, 195.1

[56] References Cited

U.S. PATENT DOCUMENTS 5,086,311 2/1992 Naka et al. .................... 354/94 X

FOREIGN PATENT DOCUMENTS 1-145772 10/1989 Japan .
3-84821 8/1991 Japan .

Primary Examiner—Michael L. Gellner
Assistant Examiner—Howard B. Blankenship
Attorney, Agent, or Firm—Keck, Mahin & Cate

[57] ABSTRACT

A variable format compact camera with a retractable lens is variable between a standard format in which an image area having standard size is defined on a standard format film, and a panoramic format in which an image area having a panoramic size is formed on the standard format film. The image area having a panoramic size is more longitudinal than the image area having a standard size.

5 Claims, 4 Drawing Sheets

VARIABLE FORMAT CAMERA WITH A RETRACTABLE LENS

BACKGROUND OF THE INVENTION

1. Field of the Invention

The present invention relates to a camera with a retractable or collapsible "taking" lens which is mounted on a camera body so as to extend or protrude from a camera body for taking a photograph and be collapsed or retracted within the camera body for the purpose, of easy carrying and, more particularly, to a camera with a retractable lens which is variable between two photograph formats, such as a standard format in which a standard size of image area is defined on a standard format film, and a panoramic format, in which a panoramic size of image area is formed on the standard format film.

Various kinds of cameras with a retractable lens, such as 35 mm. format cameras, have been developed which can take photographs in different formats. Taking for instance, a retractable lens compact camera, such a camera can be made available in two different formats, such as a standard format, in which a standard size of image area is formed on a standard format film, for instance, a 35 mm. format film, and a panoramic format, in which a panoramic size of image area is formed on the standard format film.

2. Description of Related Art

Such a retractable lens, variable format compact camera has a format varying device or mechanism. The format varying device or mechanism typically comprises a rectangularly-shaped aperture frame for defining a standard format of image area on a standard format film and an aperture reducing means for partly covering or hiding the rectangularly-shaped aperture frame so as to define a panoramic format of image area on the standard format film which is more elongated in size than the standard format of image area. One such aperture reducing means or mechanism includes a light opaque or shield means, such as upper and lower rectangular flaps or blades, adapted to turn so as to cover and uncover upper and lower longitudinal sides of the aperture frame. For actuating or turning the light shielding means in a form of a pair of rectangular blades, there is provided a format varying mechanism including a pair of actuating levers which are pivoted for turning movement by shafts extending in a direction perpendicular to an optical axis of the taking lens and which cooperate with each other so as to turn the upper and lower blades, respectively. Each actuating lever is urged by a return spring so as thereby to be turned from a position wherein it retains its associated blade to a position wherein it releases the associated blade. Manually or electrically turning one of the actuating levers in one direction against the return spring causes a turn of another lever so as to turn the upper and lower blades in opposite directions, thereby covering the upper and lower longitudinal sides of the aperture frame with the upper and lower blades and define a panoramic format of image area on a standard format film. When the actuating levers are returned or turned in the opposite direction by the return springs, respectively, the upper and lower blades are released from the actuating levers and turn so as to fully open the aperture frame, thereby defining a standard format of image area on the standard format film. Such an aperture reducing means or mechanism is known from, for instance, Japanese utility model application No. 1-145,772 filed by the applicant of this application and now opened as Japanese Unexamined Utility Model Publication No. 3-84,821.

Since the format varying device or mechanism described in the above publication needs a number of structural parts, such as a pair of actuating levers and their return springs, it is complicated in structure. In addition, the pair of actuating levers are designed and adapted to certainly cooperate with each other. Consequently it is essential for the camera to have complicated linking mechanisms between the actuating levers and the upper and lower blades as well as between the actuating levers, and these linking mechanisms must be adjusted so as to operate with high accuracy.

SUMMARY OF THE INVENTION

It is, therefore, an object of the present invention to provide a variable format compact camera with a retractable lens, a format varying mechanism of which is simple in mechanical structure and needs a reduced number of structural parts.

This object is accomplished by providing a variable format camera with a taking lens system incorporated in a retractable lens barrel which is movable in an axial direction of the taking lens system between a protruded position, in which the taking lens system is available to form an image on a standard film, such as a 35 mm. format film which is the most popular film for use with compact cameras, loaded in the camera, and a retracted position, in which the lens barrel is retracted within a camera body for easy carrying. The variable format camera has an aperture frame which forms a rectangular aperture so as to define a standard size of a rectangular image area on the standard film. This aperture frame is varied in size from the standard size to a panoramic size by means of a light opaque aperture reducing means which is movable between an uncovering position, in which it uncovers the rectangular aperture, and a covering position in which it covers part of the rectangular aperture along at least one of upper and lower longitudinal sides of the aperture frame so as to reduce the rectangular aperture to the panoramic size from the standard size. The panoramic size of another rectangular aperture on the standard film is thereby defined. The light opaque aperture means, which includes, for instance, a pair of, or upper and lower, rectangular light opaque blades disposed along the upper and lower longitudinal sides of the aperture frame, are forced or turned to the covering position by the lens barrel while the lens barrel moves to the retracted position. In order to hold the aperture reducing means in the covering position, the camera is provided with a format shift means, which is movable between a standard format position and a panoramic format position. In the panoramic format position, the format shift means holds the aperture reducing means, which has been forced to the covering position by the lens barrel moving to the retracted position. When the format shift means is moved to the panoramic format position, it releases the aperture reducing means to the uncovering position.

The variable format camera has a reversible motor for moving the lens barrel in the axial direction of the taking lens system between the protruded position and the retracted position. The motor is controlled by a motor control means to be initially actuated in one direction so as to move the lens barrel to the retracted position from the protruded position and then in a reversed direction so as to move the lens barrel back to the protruded position when the format shift means is moved to the panoramic format position.

For forcing the aperture reducing means to the uncovering position when the format shift means is moved to the standard format position, there is provided a return spring urging the aperture reducing means toward the uncovering position.

When there is a demand for panoramic photography, the format shift means is manually operated to the panoramic format position so as to be ready for holding the aperture reducing means in the covering position. If the lens barrel is previously in the protruded position, the motor control means actuates the motor so as to move the lens barrel initially to the retracted position. During the movement of the lens barrel to the retracted position, the lens barrel forces the aperture reducing means towards the covering position so as to bring the aperture reducing means into engagement with the format shift means at the retracted position. When the aperture reducing means completely reaches the covering position, it is held in the covering position by the format shift means. Thereafter, the motor control means reverses the motor so that it rotate in the reversed direction so as to move the lens barrel towards the protruded position. At the protruded position, the motor is stopped so as to locate and retain the taking lens system for photography, so as to partly hide the aperture frame, thereby bringing the camera into the panoramic photography format. On the other hand, when the format shift means is operated so that it is placed into the panoramic format position while the lens barrel has been retracted within the camera body, since the lens barrel maintains the aperture reducing means in the covering position so as to be ready for engagement by the format shift means, the format shift means can immediately hold the aperture reducing means in the covering position when it reaches the panoramic format position. Simultaneously, the format shift means causes the motor control means to actuate the motor to rotate in the reversed direction, thereby moving the lens barrel to the protruded position. In this manner, the camera is varied and placed into the panoramic photography format.

On the other hand, when there is a demand for standard photography, the format shift means is manually operated to the standard format position, in which it never engages the aperture reducing means. If the lens barrel is previously in the protruded position, the motor control means does not actuate the motor so as to maintain the lens barrel in the protruded position. Consequently, as the format shift means moves towards the standard format position, the aperture reducing means is released from the format shift means and is forced to the uncovering position by the return spring, so as to fully open the aperture frame, thereby bringing the camera into the standard photography format. On the other hand, when the format shift means is operated so that it is placed into the standard format position while the lens barrel has been retracted within the camera body position, the format shift means releases the aperture reducing means. However, the aperture reducing means is still retained in the covering position by the lens barrel but is ready for disengagement from the format shift means. Immediately after the format shift means has been operated to the standard format position, the motor control means actuates the motor so as to rotate in the reversed direction, thereby moving the lens barrel to the protruded position. As the lens barrel moves towards the protruded position, the aperture reducing means is forced to the uncovering position by the return spring, so as to fully open the aperture frame, thereby bringing the camera into the standard photography format.

BRIEF DESCRIPTION OF THE DRAWINGS

The above and other objects and features of the present invention will be apparent to those skilled in the art from the following description of a preferred embodiment thereof when considered in conjunction with the appended drawings, in which.

DETAILED DESCRIPTION OF THE PREFERRED EMBODIMENT

Because retractable lens cameras are well known, the present description will be directed, in particular, to elements forming parts of, or cooperating with, the novel mechanism in accordance with the present invention. It is to be understood that elements not specifically shown or described can take various forms well known to those skilled in the camera art.

Figure 1:
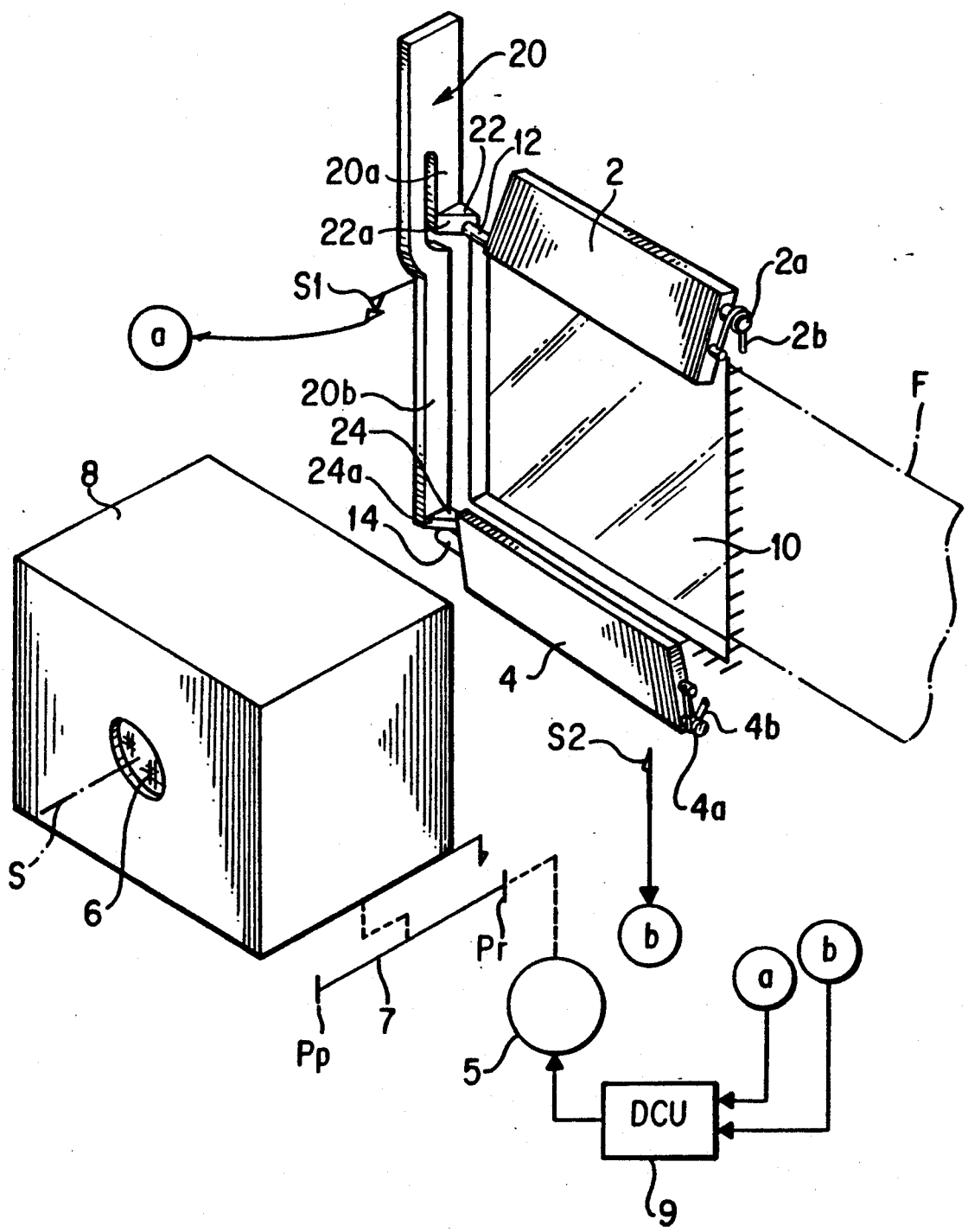
FIG. 1 is a schematic perspective illustration showing an essential interior mechanism of a camera with a photographic mode changing feature in accordance with a preferred embodiment of the present invention.
Figure 6:
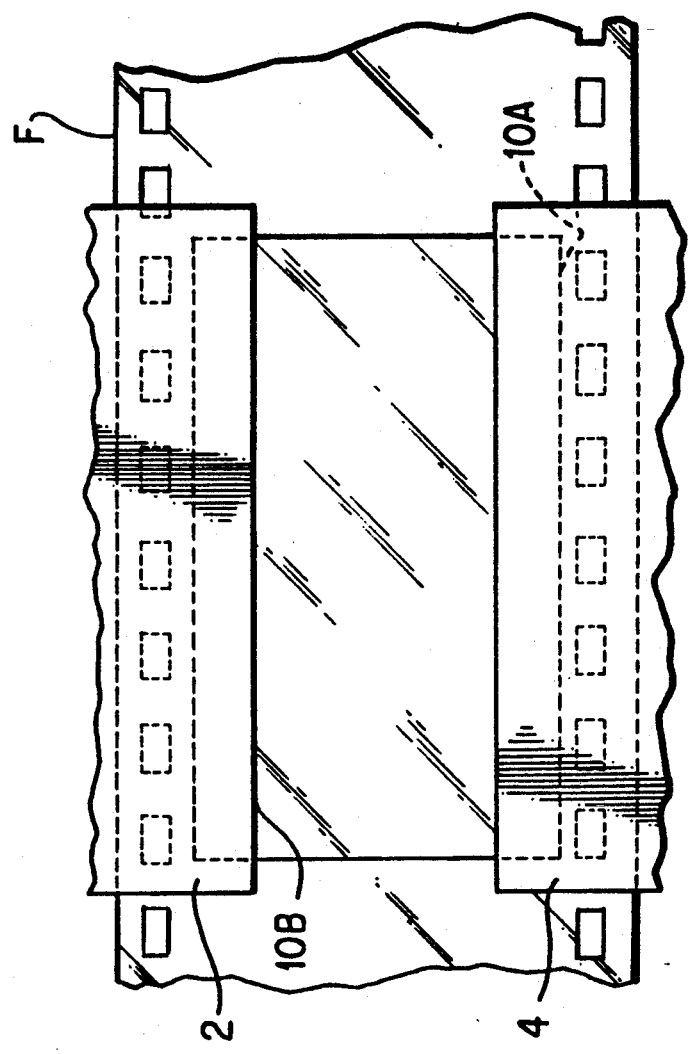
FIG. 6 is an illustration for showing a standard image area and a panoramic image area formed on a film.

Referring to the drawings in detail, and, more particularly, to FIG. 1, a variable format camera 1 equipped with a retractable lens in accordance with a preferred embodiment of the present invention is shown. The camera 1 include a retractable lens barrel 8, in which a taking lens 6, which may have either a single lens element or a plurality of lens elements, is incorporated. The lens barrel 8 is supported for axial movement by a lens mount of the camera body (not shown) of the camera 1 so as to move in a direction of the optical axis S of the taking lens 6 between a collapsed or retracted position Pr, in which the taking lens 6 is located within the camera body for protection and easy carrying, and an extended or protruded position Pp, in which the taking lens 6 is positioned properly with respect to a focal plane thereof in which a film F, such as a 35 mm. standard format film, is placed. In order to shift the lens barrel 8 between the retracted position Pr and the protruded position Pp, the camera 1 is provided either with a motor driven slide mechanism or with a motor driven helicoid mechanism, both of which may be of any well known type in the art. In the camera 1, there is provided a rectangular aperture frame 10 for defining a standard size of rectangular aperture 10A. Along the upper longitudinal side of the aperture frame 10, there is disposed a rectangular upper opaque or light shield blade 2 held by an upper pivot 2a. Similarly, along the lower longitudinal side of the aperture frame 10, there is disposed a rectangular lower opaque or light shield blade 4 held by an upper pivot 4a. These light shield blades 2 and 4, which constitute a aperture reducing means, are capable of consistently turning in opposite directions about the upper and lower pivots 2a and 4a, respectively. When the aperture reducing means 2 and 4 are turned, in one direction to their covering positions, they hide or cover upper and lower parts of the standard size of rectangular aperture 10A, thereby reducing the rectangular aperture 10A to another rectangular aperture 10B so as to define a panoramic size of rectangular aperture 10B. When the aperture reducing means 2 and 4 are turned, in another direction to their uncovering positions, they open or uncover the upper and lower portions of the rectangular aperture frame 10, thereby defining the standard size of rectangular aperture 10A. As is shown in FIG. 6, the panoramic size of rectangular aperture 10B is the same in length as the standard size of rectangular aperture 10A but narrower in width and more elongated than the standard size of rectangular aperture 10A. In such a way, the camera 1 varies its photographic format. In more detail, when the upper light shield blade 2 turns downward in the counterclockwise direction to its covering position and the lower light shield blade 4 turns upward in the clockwise direction to its covering position, the standard size of rectangular aperture 10A is hidden or covered by the upper and lower light shield blades 2 and 4 at its upper and lower portions and is varied so that it becomes smaller in width so as to define a reduced size of rectangular aperture 10B on the standard film F, suitable for panoramic photographs. On the other hand, when the upper light shield blade 2 turns back upward in the clockwise direction to its uncovering position and the lower light shield blade 4 turns back downward in the counterclockwise direction to its uncovering position, the rectangular aperture frame 10 is fully opened so as to define the ordinary or standard size of rectangular aperture 10A on the standard film F, suitable for ordinary or standard photographs. The pivots 2a and 4a are provided with return springs, such as torsion springs 2b and 4b, respectively, which urge the upper and lower light shield blades 2 and 4 towards their uncovering positions. Each light shield blade 2 or 4 is provided with a pin 12 or 14 offset from the pivot 2a or 4a and extending laterally in a direction perpendicular to the optical axis S from one end thereof.

On one side of the aperture frame 10, there is provided a format shift means in a form of a manually operable lever 20 incorporated in the camera 1. The format shift means can slide upward to its standard format position and downward to its panoramic format position in a vertical direction perpendicular to the direction in which the pins 12 and 14 of the light shield blades 2 and 4 extend. The format shift lever 20 has two elastically bendable arms 20a and 20b. The bendable arm 20a of the format shift lever 20 is integrally formed with a generally triangularly shaped projection 22 at its lower end, one side surface 22a of the projection 22 being sloped in a direction parallel to the optical axis S from front to back and being engagable with the pin 12 when the upper light shield blade 2 turns toward the covering position while the format shift lever 20 is in its panoramic format position. Similarly, the bendable arm 20b of the format shift lever 20 is integrally formed with a generally triangularly shaped projection 24 at its lower end, one side surface 24a of the projection 24 being sloped in a direction parallel to the optical axis S from front to back and being engagable with the pin 14 when the lower light shield blade 4 turns toward the covering position while the format shift lever 20 is in its panoramic format position. These projections 22 and 24 are aligned in a vertical straight line perpendicular to the optical axis S.

Selectively bringing the aperture frame 10 of the camera into the standard size of rectangular aperture 10A and the panoramic size of rectangular aperture 10B is executed by manually operating the format shift lever 20. Specifically, when format shift lever 20 is manually slid down to its lower position or panoramic format position for providing the panoramic size of rectangular aperture 10B, it locates its projections 22 and 24 in the paths of turning movement of the pins 12a and 14a of the light shield blades 2 and 4 about the pivots 2a and 4a, respectively. On the other hand, when the format shift lever 20 is slid up to its upper position or standard format position for providing the standard size of rectangular aperture 10A, it locates its projections 22 and 24 out of the paths of turning movement of the pins 12a and 14a of the light shield blades 2 and 4 about the pivots 2a and 4a, respectively.

Motor driven shift mechanism 7 includes a motor 5 which is able to rotate in opposite directions so as to move the lens barrel 8 between the protruded position Pp and the retracted position Pr. The motor 5 is actuated and controlled by a motor drive control unit (MCU) 9 so as to move the lens barrel 8 between the retracted position Pr and the protruded position Pp when a manually operable shift switch (not shown) is operated and the format shift lever 20 is operated. Specifically, the motor drive control unit (MCU) 9 is designed and adapted so that when the shift switch is operated while the lens barrel 8 is in the retracted position, the motor 5 is actuated to move the lens barrel 8 to the protruded position Pp and. However, when the format shift lever 20 is operated downward to the panoramic format position while the lens barrel is in the in the protruded position Pp, the motor is actuated to move the lens barrel 8 initially to the retracted position Pr and then to the protruded position Pp.

The operation of the photograph mode shift mechanism depicted in FIG. 1 is best understood from the following description when considered in conjunction with FIGS. 2 to 5, which are sectional views showing a cross section including the optical axis S.

Figure 2:
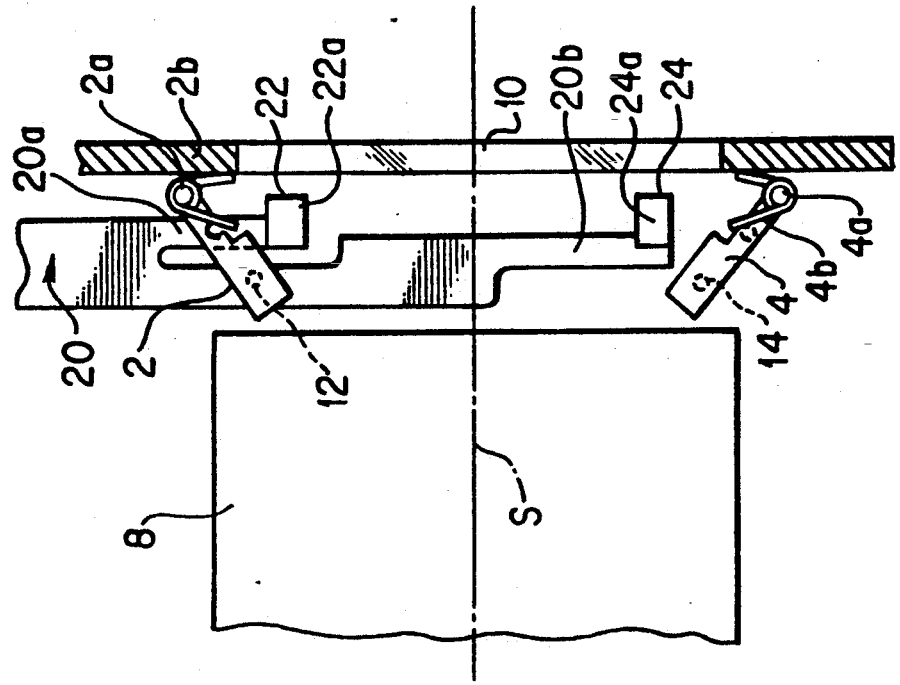
FIG. 2 is a diagrammatical view showing a cross section of the camera shown in FIG. 1 including an optical axis of a taking lens in which the camera is being changed to its panoramic photograph mode from its standard photograph mode.
Figure 3:
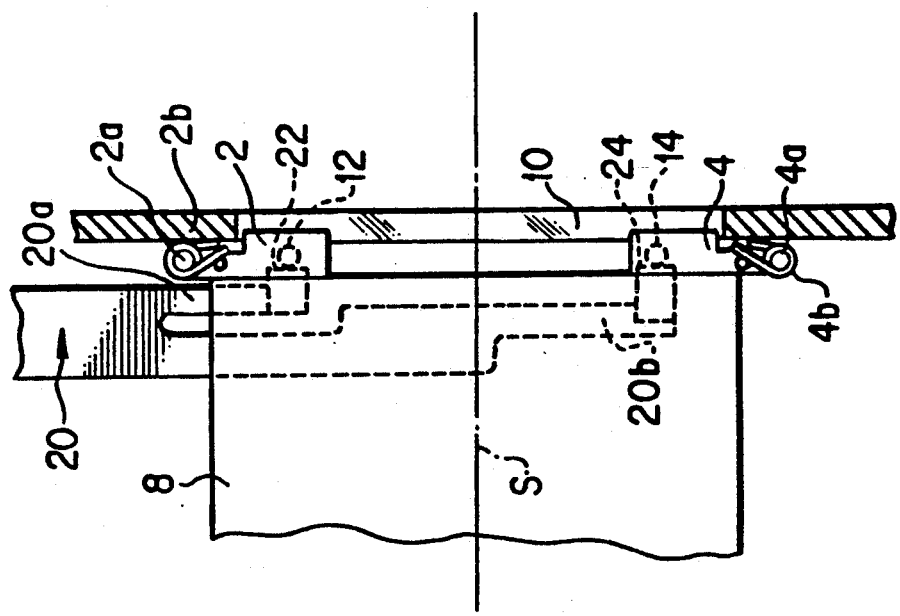
FIG. 3 is a diagrammatical view, showing the same cross section of the camera as shown in FIG. 2, in which the camera is still being changed to its panoramic photograph mode from its standard photograph mode.

When the format shift lever 20 is slid down to the panoramic format position for varying the camera to the panoramic mode from the standard mode so that the light shield blades 2 and 4 are in their standard format positions while the lens barrel 8 is held in the protruded position Pp as shown in FIG. 2, the format shift places both the side surface 22a of the projection 22 and the side surface 24a of the projection 24 in the paths of turning movement of the pins 12 and 14 of the upper and lower light shield blades 2 and 4, respectively. Simultaneously, the format shift lever 20 closes a switch S1 at its panoramic format selecting position to provide an electric signal to the motor drive control unit (MCU) 9. As a result, the motor drive control unit (MCU) 9 actuates the motor 5 so as to move the lens barrel 8 backward towards the retracted position Pr. During the backward movement of the lens barrel 8 to the retracted position Pr, the lens barrel 8 abuts the upper and lower light shield blades 2 and 4 and turns them about the pivots 2a and 4a to their covering positions against the torsion springs 2b and 4b. As the upper and lower light shield blades 2 and 4 move towards their covering positions, the pin 12 and the pin 14 are brought into sliding engagement with the side surface 22a of the projection 22 and the side surface 24a of the projection 24, respectively, and slide on them so as to bend the arms 20a and 20b. When the lens barrel 8 reaches completely the retracted position Pr, the pins 12 and 14 ride over the side surfaces 22a and 24a, respectively, so as to be disengaged from the projections 22 and 24. This is accompanied by registration of the arms 20a and 20b of the format shift lever 20 into the paths in which the pins 12 and 14, turn respectively. In other words, the pins 12 and 14 are positioned directly behind the projections 22 and 24 and engaged by the projections 22 and 24, so that the upper and lower light shield blades 2 and 4 are prevented, by the projections 22 and 24, from being turned about the pivots 2a and 4b due to the torsion springs 2b and 4b as shown in FIG. 3. As a result, the upper and lower light shield blades 2 and 4 overlap and hide or cover the upper and lower portions of the aperture frame 10 to reduce the standard size of rectangular aperture 10A, thereby defining the panoramic size of rectangular aperture 10B which is more elongated than the standard size of rectangular aperture 10A.

When the lens barrel 8 reaches the retracted position Pr, the switch S2 is closed to provide an electric signal to the motor drive control unit (MCU) 9. The motor drive control unit 9 reverses the motor 5 so that it rotates in the reversed direction and moves the lens barrel 8 towards the protruded position Pp from the retracted position Pr. At the moment the lens barrel 8 reaches the protruded position Pp, the motor drive control unit 9 stops the motor 5, so as to fix the lens barrel 8 at the photographic position, thereby making the camera ready for panoramic photography as is shown in FIG. 4.

Figure 5:
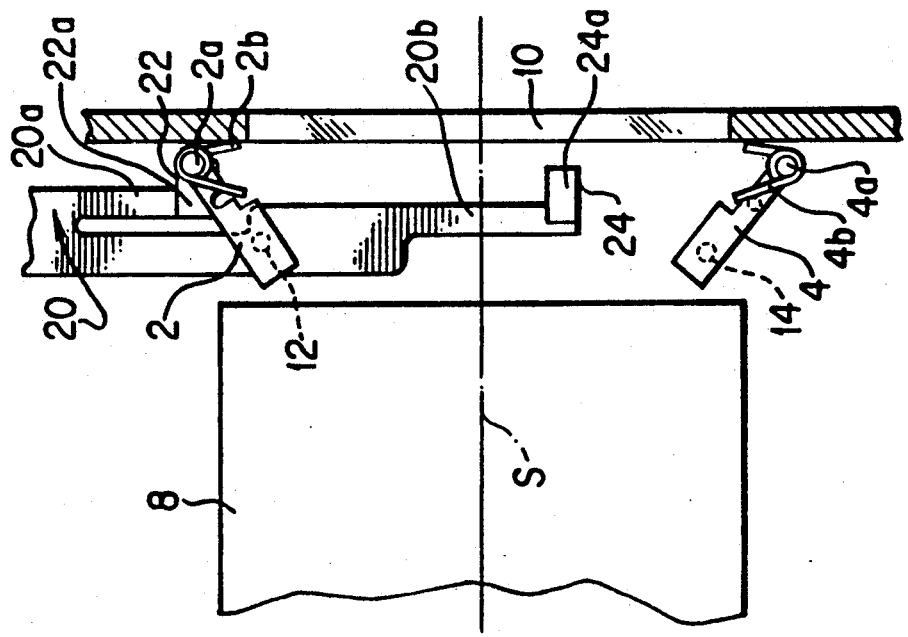
FIG. 5 is a diagrammatical view, showing the same cross section of the camera as shown in FIG. 2, in which the camera is in its standard photograph mode.

When there arises a demand for placing the camera in the standard mode while the camera is held in the panoramic mode, the format shift lever 20 is slid upward to its standard format position. The upward sliding movement of the format shift lever 20 brings the projections 22a and 24a out of engagement with the pins 12 and 14, allowing the upper and lower light shield blades 2 and 4 to be forced to their standard format positions by the torsion springs 2b and 4b as shown in FIG. 5. As a result, the upper and lower light shield blades 2 and 4 fully open the standard aperture 10A defined by the aperture frame 10.

Figure 4:
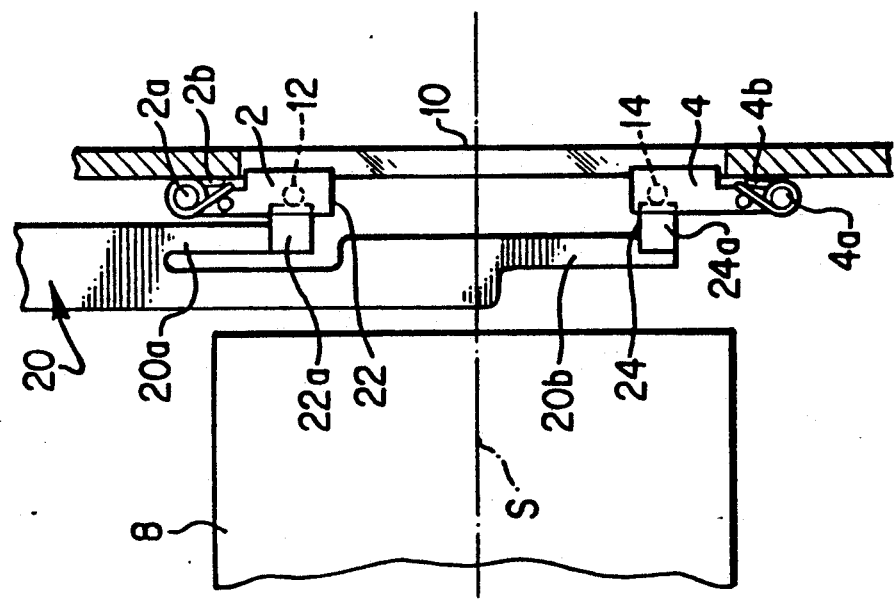
FIG. 4 is a diagrammatical view, showing the same cross section of the camera as shown in FIG. 2, in which the camera is in its panoramic photograph mode.

For retracting the lens barrel 8 within the camera body, either while the camera is in its panoramic mode shown in FIG. 4 or while the camera is in its standard mode shown in FIG. 5, the lens barrel 8 is moved backward to its retracted position Pr either manually or by means of the motor 5. During the backward movement of the lens barrel 8 to the retracted position Pr, if the upper and lower light shield blades 2 and 4 are in their uncovering positions (FIG. 5), the upper and lower light shield blades 2 and 4 are forced by the lens barrel 8 towards their covering position. Because the format shift lever 20 has been slid up to its standard format position, the upper and lower light shield blades 2 and 4 are turned toward their covering positions without any interference with the projections 22 and 24 of the format shift lever 20. When the lens barrel 8 reaches the retracted position Pr within the camera body and is held there, the upper and lower light shield blades 2 and 4 are retained in their covering positions. On the other hand, if the upper and lower light shield blades 2 and 4 are in their covering positions (FIG. 4), the lens barrel 8 is moved backward until it abuts the upper and lower light shield blades 2 and 4 which have been held by the format shift lever 20 in their covering position. That is, the lens barrel 8 is simply moved to its retracted position Pr without being accompanied by anything. If the format shift lever 20 has been slid up to its standard format position while the lens barrel 8 is in its retracted position Pr, when the shift switch is operated to make the camera ready for photography, the motor 5 is actuated so as to move the lens barrel 8 forward to its protruded position Pp, which is accompanied by turning of the upper and lower light shield blades 2 and 4 to their uncovering positions.

Format shift lever 20 may be electrically operated by the use of, for instance, an electrically operated magnetic solenoid in place of being manually operated. In this case, a manually operable switch is provided to control the energization and deenergization of the magnetic solenoid so as to force the format shift lever 20 to slide up and down between the standard format position and the panoramic format position.

Taking lens 6 may be a variable focus lens system, such as a zoom lense or a lens system which has two fixed focal lengths. If a variable focus lens system, is used adjusting of the variable focus lens system to its shortest focal length when the camera is varied to the placed in the panoramic mode, can be performed, and angle panoramic photograph can be taken. It is desirable to automatically fix the variable focus lens system to the shortest focal length, accompanying a panoramic format selection, by the format shift lever 20.

It is to be understood that although the present invention has been described with respect to a preferred embodiment thereof, various other embodiments and variants may occur to those skilled in the art. Any such other embodiments and variants which fall within the scope and spirit of the invention are intended to be covered by the following claims.

What is claimed is:

1. A variable format camera with a taking lens system incorporated in a retractable lens barrel which is movable in an axial direction of said taking lens system between a protruded position, wherein said taking lens system is available to form an image on a film loaded in the camera, and a retracted position, wherein said retractable lens barrel is within a camera body, said variable format camera comprising:

an aperture frame provided in said camera body, and having upper and lower longitudinal sides and transverse ends so as to define a standard size of a rectangular aperture on said film;

light opaque aperture reducing means movable between an uncovering position and a covering position for uncovering said rectangular aperture so as to provide said standard size of said rectangular aperture when moved to said uncovering position and for covering part of said rectangular aperture along at least one of said upper and lower longitudinal sides of said aperture frame so as to reduce said rectangular aperture to a panoramic size from said standard size when moved to said covering position, thereby defining said panoramic size of another rectangular aperture on said film, said light opaque aperture means being forced to said covering position by said lens barrel moving to said retracted position; and format shift means movable between a standard format position and a panoramic format position for holding said light opaque aperture reducing means forced to said covering position by said lens barrel in said covering position while it is in said panoramic format position and for releasing said light opaque aperture reducing means to said uncovering position when moved to said standard format position.

2. A variable format camera as recited in claim 1, and further comprising a reversible motor for moving said lens barrel between said protruded position and said retracted position in said axial direction and motor control means for actuating said motor initially in one direction so as to move said lens barrel to said retracted position from said protruded position and then in a reversed direction so as to move said lens barrel to said protruded position when said format shift means is moved to said panoramic format position.

3. A variable format camera as recited in claim 2, wherein said light opaque aperture reducing means comprises a pair of rectangular light shield blades disposed along said upper and lower longitudinal sides of said aperture frame, each rectangular blade being pivoted by a shaft disposed parallel to said longitudinal sides so as to turn between said covering position and said uncovering position.

4. A variable format camera as recited in claim 3, wherein said format shift means comprises a pin which is offset from said shaft and extends laterally from said rectangular light shield blades and a format shift lever movable in a direction perpendicular to said axial direction between said standard format position and said panoramic format position, said format shift lever being elastically bendable and formed with a slanted projection which is positioned in a turning path of said pin when it is in said panoramic format position so as to be slidably engaged by said pin.

5. A variable format camera as recited in claim 4, wherein said format shift means further comprises a return spring for urging each of said light shield blades to said uncovering position.

* * * * *

UNITED STATES PATENT AND TRADEMARK OFFICE
CERTIFICATE OF CORRECTION

PATENT NO. : 5,258,790
DATED : November 2, 1993
INVENTOR(S) : Yasuhiko TANAKA

It is certified that error appears in the above-identified patent and that said Letters Patent is hereby corrected as shown below:

On the title page,

In [75], change "Tasuhiko Tanaka" to --Yasuhiko Tanaka--.

Signed and Sealed this

Tenth Day of May, 1994

Attest:

BRUCE LEHMAN

Attesting Officer     Commissioner of Patents and Trademarks